United States Patent [19]

Almada

[11] Patent Number: 4,640,516
[45] Date of Patent: Feb. 3, 1987

[54] METALLIC SEAL WITH INTERLOCKING J-SHAPED LIPS

[76] Inventor: Edward M. Almada, 7537 Linden St., Hammond, Ind. 46224

[21] Appl. No.: 829,933

[22] Filed: Feb. 18, 1986

Related U.S. Application Data

[62] Division of Ser. No. 634,140, Jul. 25, 1984, Pat. No. 4,585,023.

[51] Int. Cl.$^4$ .............................................. F16J 15/06
[52] U.S. Cl. ................................... 277/236; 277/205; 277/212 R; 277/DIG. 10
[58] Field of Search ............... 277/205, 206 R, 212 R, 277/212 C, 236, DIG. 10; 251/214

[56] References Cited

U.S. PATENT DOCUMENTS 4,290,614  9/1981  Moll .................................. 277/236 X
4,410,163  10/1983  Scobie et al. ..................... 251/214 X

FOREIGN PATENT DOCUMENTS 732801  3/1943  Fed. Rep. of Germany ...... 277/236
33309  4/1928  France ................................ 277/236
444217  3/1936  United Kingdom ................ 277/236

Primary Examiner—Robert S. Ward
Attorney, Agent, or Firm—Parkhurst & Oliff

[57] ABSTRACT

A packing resistant valve has a gate rotatably mounted within an angled valve body and an inlet face of the gate defines a concave recess for inducing eddy currents in fluid flow impinging thereon. The eddy currents direct fluid flow away from the valve body, reducing the tendency of the fluid to accumulate within the valve body. Because the valve body is angled, material tends to drain from the body under the influence of gravity. Also, the angled configuration results in the formation of an air pocket within the valve body, precluding packing therein. In one embodiment, a mechanical seal is provided to preclude fluid leakage across the valve stem. In a further embodiment of the invention, a diverter valve assembly is disclosed, which includes a diverter plate for preventing the impingement of fluid against the closed valve disk.

1 Claim, 12 Drawing Figures

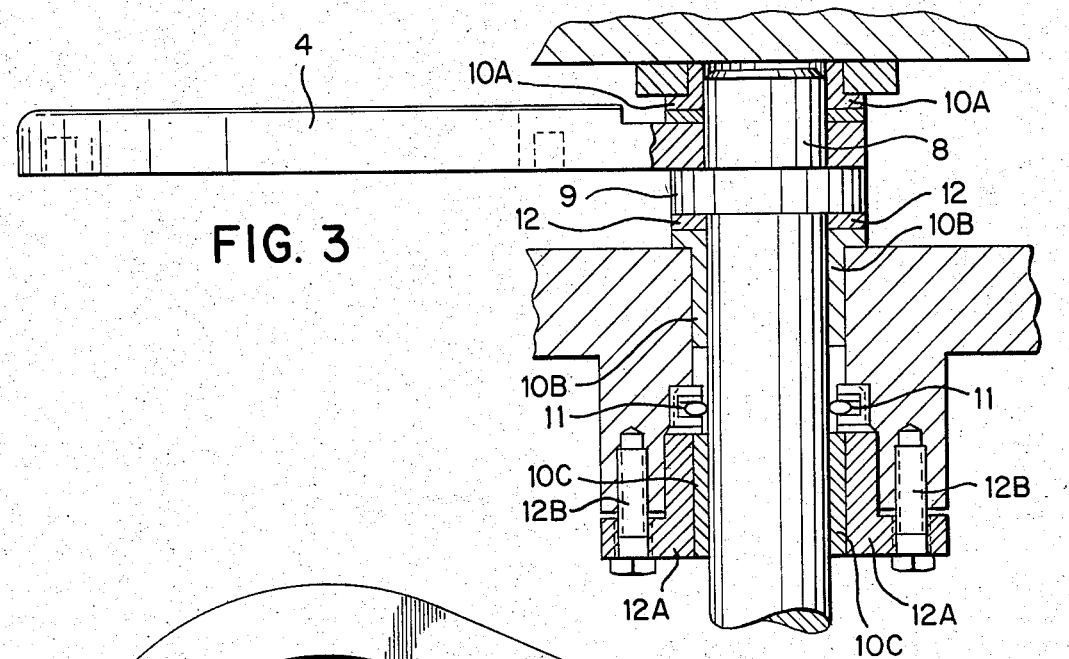
FIG. 3
FIG. 4
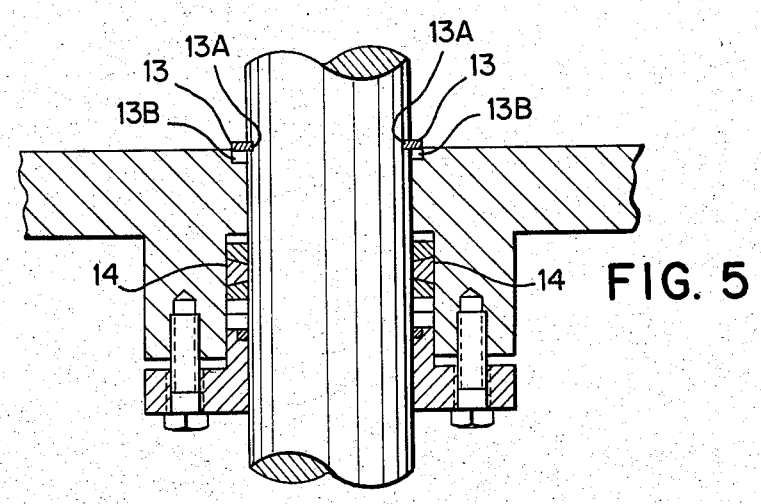
FIG. 5

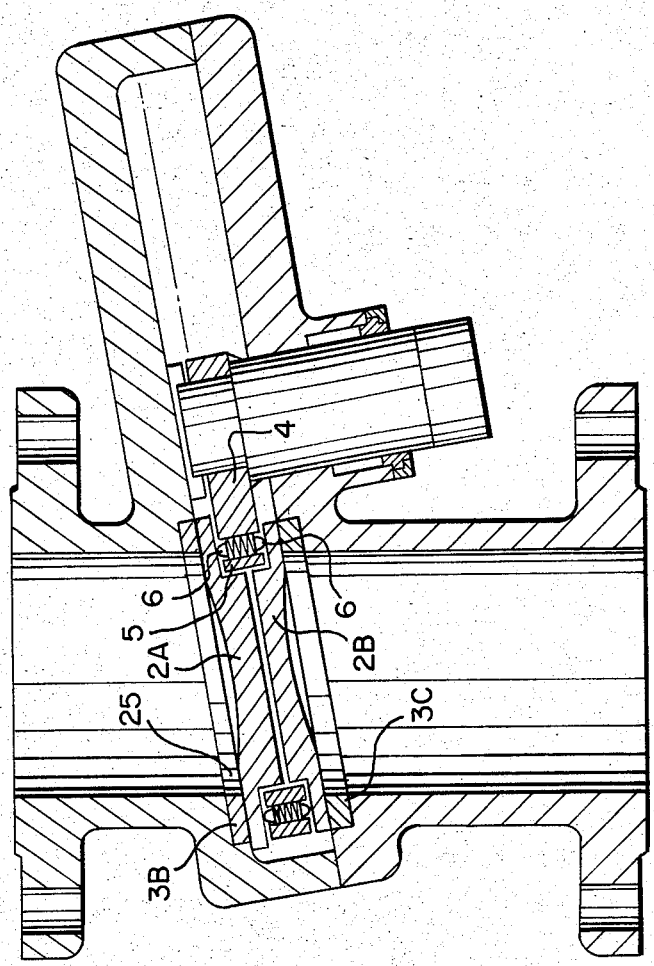
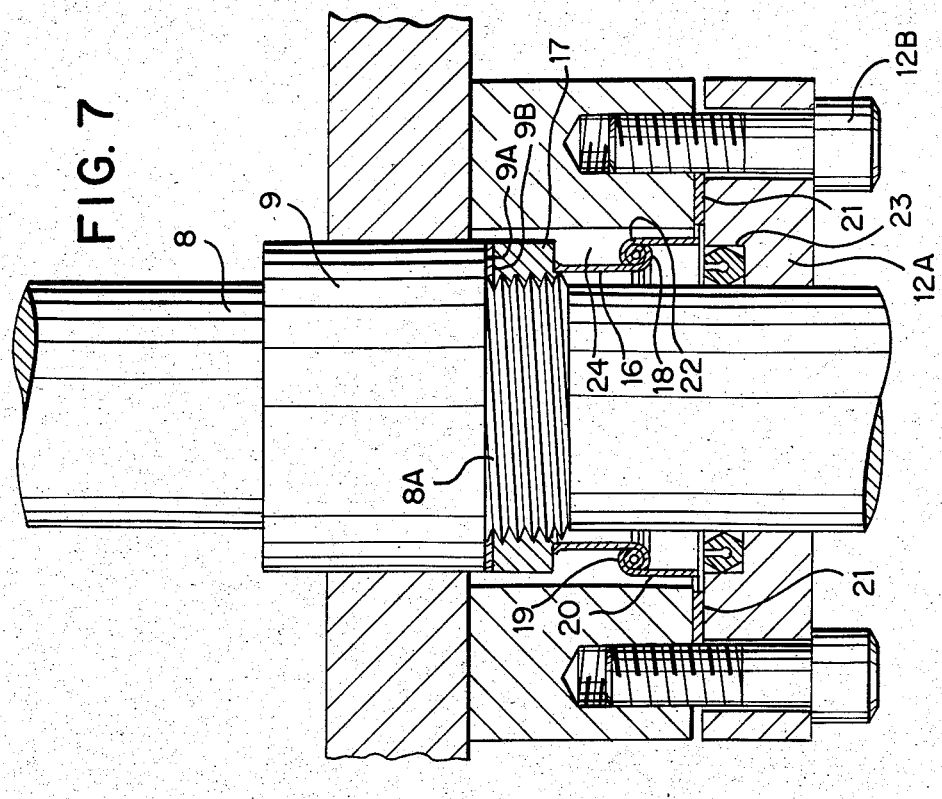
FIG. 8
FIG. 7

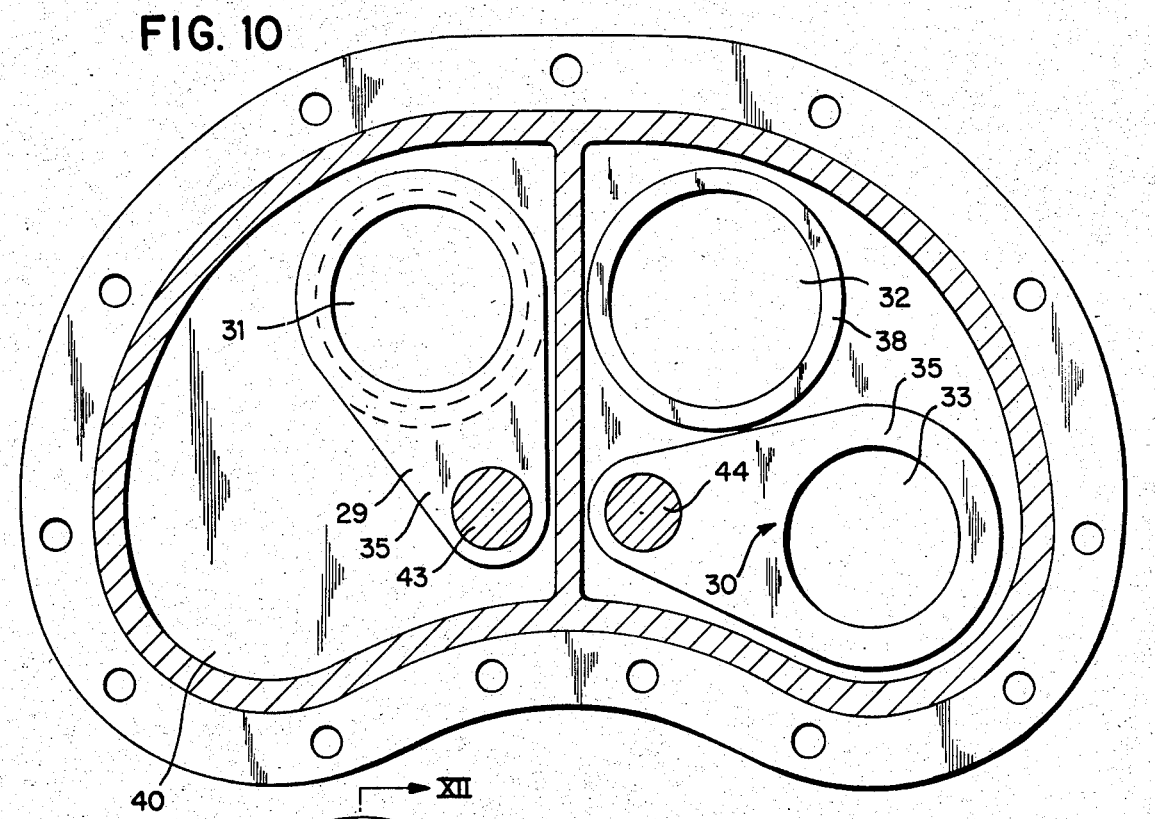
FIG. 10
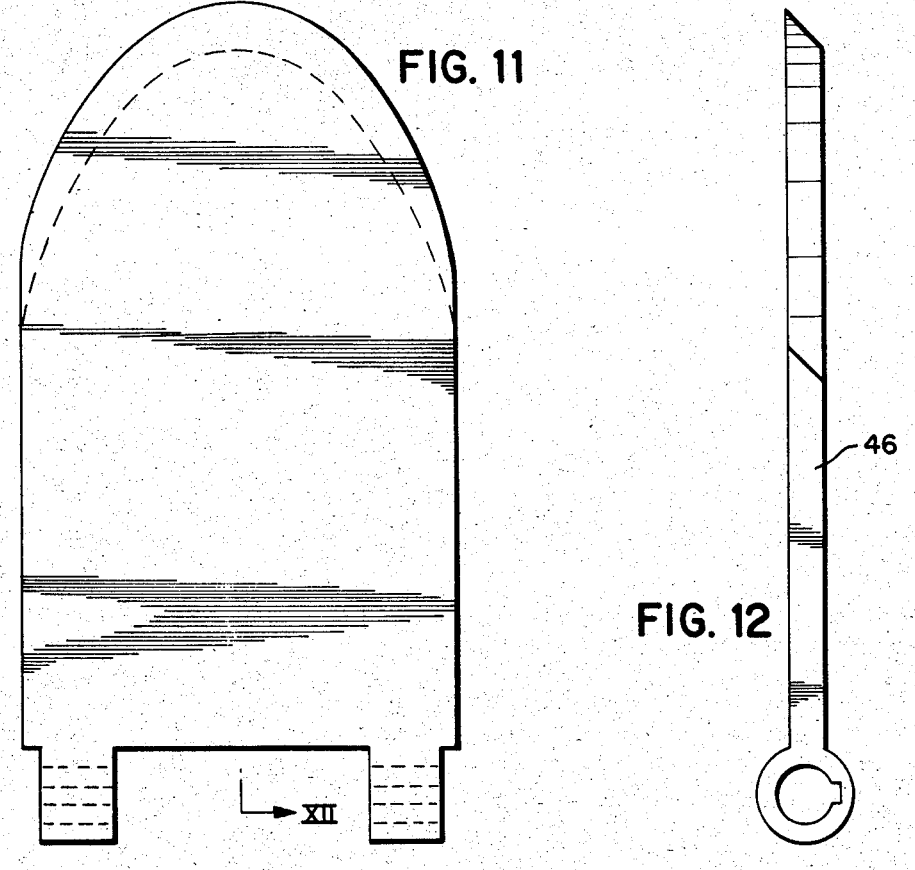
FIG. 11
FIG. 12

4,640,516

METALLIC SEAL WITH INTERLOCKING J-SHAPED LIPS

This is a division of application Ser. No. 634,140 filed July 25, 1984, now U.S. Pat. No. 4,585,023.

BACKGROUND OF THE INVENTION

1. Field of the Invention

The present invention relates to gate valves and more particularly to swinging gate valves of the type wherein the gate or valve disk is urged against its seat by spring pressure and by material pressure in the line closed by the valve. In prior valves of this type, the passage of fluid through the valve body is controlled by port-sealing disks which are mounted in swing arms and which swing into and out of alignment with a port connecting the inlet and outlet conduits of the valve body. The port sealing elements and the mechanism for activating the sealing elements in valves of this type do not completely fill the space defined for the valve body. Frequently, sediment from the fluid passing through the valve becomes deposited within the valve body causing the valve to pack, inhibiting the opening and closing of the valve. This is particularly true in applications of the valve for coarse materials, such as iron, limestone, abrasive vapors, sludge, tar sand, slurries and other materials which tend to accumulate in the valve chamber. Besides the above problem, these rugged materials also tend to get between the valve seat and the cooperating sealing disk. This often results in damage to the valve seat and sealing disk due to the abrasive nature of these materials.

The problems associated with packing are greatly pronounced with swinging gate type valves because the sealing element is mounted to a swing arm adapted to be swung to seal and unseal the valve port. When the swing arm rotates it tends to compact sediment within the valve chamber, packing that sediment within the chamber, thereby rendering the mechanical operation of the valve difficult, if not impossible. When such a condition results, it then becomes necessary to remove the valve from the conduit and disassemble it so the sediment can be cleaned out. This practice is often extremely costly since many valves are so situated that it is necessary to shut down the flowline or completely drain the line before the valve can be removed and cleaned. Additionally, the facility being serviced by the valve is disabled pending completion of the valve servicing.

With the foregoing disadvantages in mind, the object of the present invention is to provide a packing-resistant valve which will preclude the depositing of accumulative sediment within the valve chamber. A further object of the invention is to form a valve in which the cleaning operation may be accomplished automatically and without the necessity of dismantling of the valve.

A still further object of the present invention is to provide a valve which greatly reduces the likelihood of sediment accumulation within the valve chamber.

Another object of the present invention is to provide a valve which maintains a clean seating surface.

A still further object of the present invention is to provide a valve which distributes the flow pressure better to the seating surface.

A still further object of the present invention is to provide a valve which prevents material build up in the valve chamber by inducing air pockets within the valve body.

A still further object of the present invention is to provide a valve which insures a tight port seal.

These and other objects and advantages of the present invention will become apparent upon a reading of the following detailed description, as well as the appended drawings and claims.

SUMMARY OF THE INVENTION

The aforementioned disadvantages characteristic of the prior art are alleviated by numerous advantageous structural aspects of the instant invention. By tilting the valve chamber which rotatably locates the swing arm disk assembly of a gate valve, material drainage from the chamber is induced by gravity. Additionally, a pressurized air pocket forms within the valve chamber, displacing material from that chamber, thereby preventing packing.

The disk is configured with a concave recess to induce eddy currents which carry fluid away from the valve chamber, reducing packing therein. Springs which bias the disk into engagement with the seat are circumferentially located about the disk so as not to interfere with the concave construction of the disk.

In one embodiment of the instant invention, a valve stem is located within a packing gland which is maintained fluid-tight by a durable dual-flanged mechanical seal. Dual J-shaped interlocking lips surround an annular spring having a friction-resistant coating. Crushable material is utilized to insure tight assembly of the mechanism.

In another application of many of the principles of the instant invention, a diverter valve is provided for selectively opening and closing the ports of a Y-shaped conduit. In this embodiment, a diverter plate is provided to reduce and divert high velocity, high pressure fluids from impinging upon the disk of the valve. The diversion of the fluid minimizes wear of the valve and reduces fluid leakage across the closed port of the diverter.

BRIEF DESCRIPTION OF THE DRAWINGS

The present invention will be described in detail in connection with the appended drawings in which like elements bear like reference numbers and wherein:

FIG. 3 is a cross-sectional view of a stem, a swing arm, and a packing gland according to one aspect of the present invention;

FIG. 4 is a top view of a swing arm;

FIG. 5 is a cross-sectional view of a sealed stem and packing gland according to another embodiment of the present invention;

FIG. 7 is a cross-sectional view of a sealed stem and packing gland according to another embodiment of the present invention;

FIG. 8 is a cross-sectional view of a double-disk valve according to one embodiment of the present invention;

FIG. 10 is a top view of a port, the left side being in a closed position and the right side being in an opened position;

FIG. 11 is a side view of a diverter plate according to the present invention; and FIG. 12 is a cross-sectional view taken along line XII—XII of FIG. 11.

DETAILED DESCRIPTION OF THE PREFERRED EMBODIMENT

Figure 1:
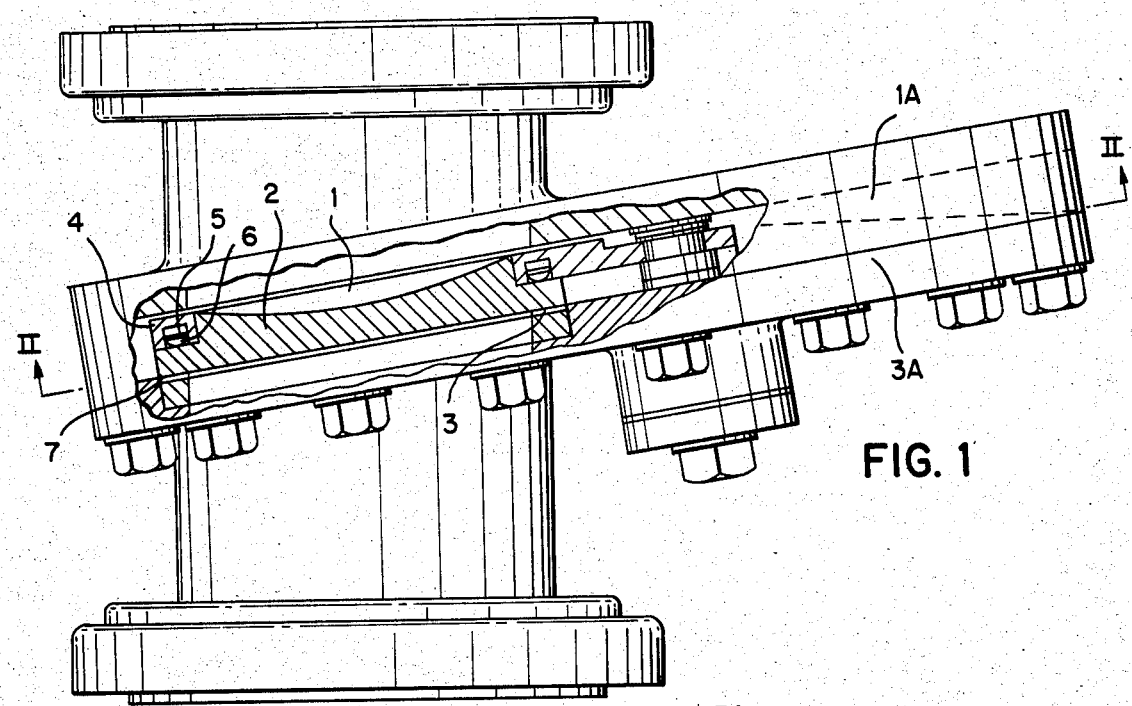
FIG. 1 is a side view in partial cut-away of a valve chamber.

With reference to the drawings, FIG. 1 shows a side view, in partial cut-away, of the valve chamber, with the swing arm in a closed position. Swing arm 4, better seen in FIG. 4, journals a concave disk 2 shown urged against port seat 3. The swing arm 4 encircles the top portion of the disk 2. Circumferentially mounted springs 5 are located between the swing arm 4 and the edge of disk 2. Rivet heads 6 cap the ends of springs 5, reducing friction between the disk and the swing arm, thereby allowing the disk to skate in a lapping motion during opening and closing of the valve. The lapping motion is caused as a result of the outer edge of the disk moving a distance greater than the inner edge. Consequently, the rotating disk does not return to the same circumferential position relative to the swing arm upon reclosing of the valve. As a result, port seat 3 wears more evenly during actuation, in which disk 2 slides back and forth, on and off port seat 3, lapping together the disk and the seat.

Figure 2:
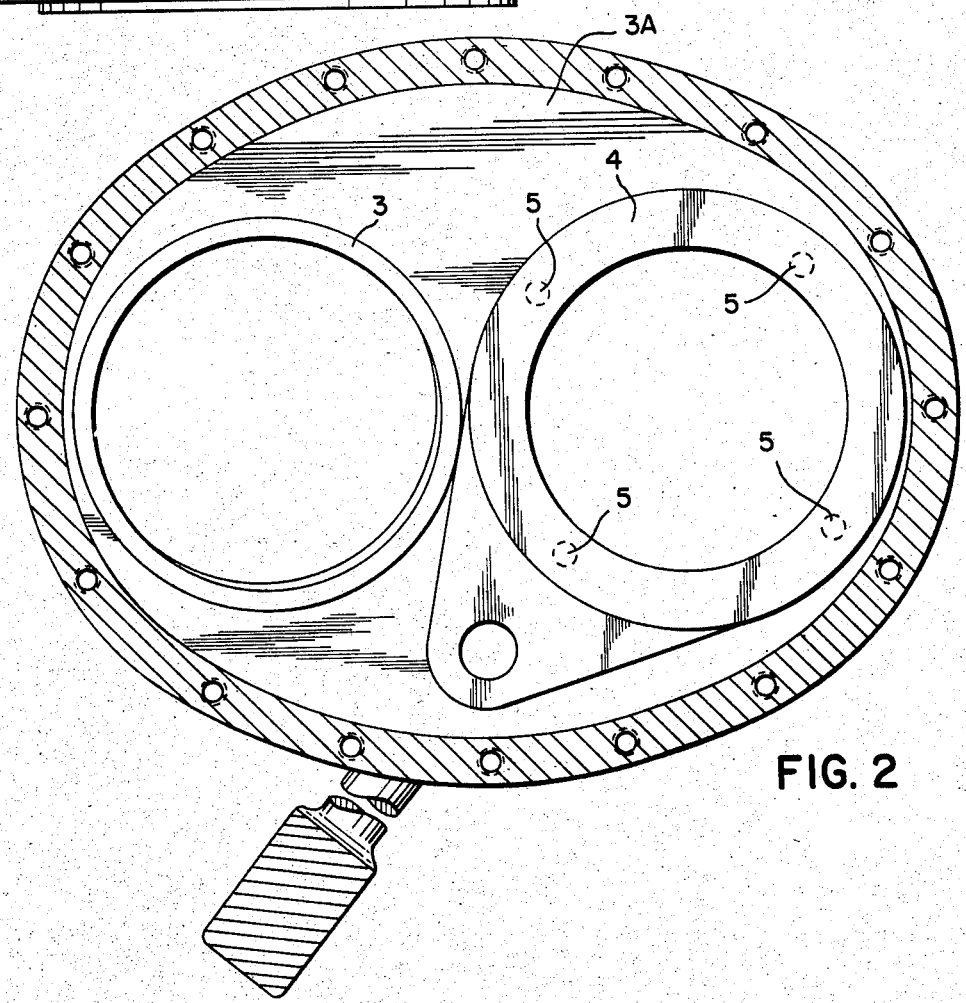
FIG. 2 is a cross-sectional view of the inlet port of a valve in an open position along line II—II of FIG. 1.

Referring to FIGS. 1 and 2, four (4) circumferentially mounted springs 5 located in the swing arm urge the disk into constant metal-to-metal contact with the port seat 3 while in a closed position, and with body seat 3A while in the open position. The springs insure that the swing arm is always supported by the disk, and is thus never cantilevered and that the disk is biased by the swing arm. This creates stability in the swing arm, reducing wear in the movable components. In order to wipe port seat 3 clean during closing of the valve, knife-edge 7 is provided on the bottom rim of the concave disk 2 to shear through any material which may deposit on port seat 3, as well as on the travel path of the body seat 3A.

Disk 2 has a concave recess formed in its upper surface. The concave recess of disk 2 preferably with its center offset from the main axis of the valve, induces an eddy-current effect on material flow in the conduit when in the closed position. These eddy currents act to move material away from port seat 3 and the interior of the bonnet. Consequently, less material tends to enter the valve chamber or bonnet region.

The valve body 1 and swing arm 4 are angled 10° from the horizontal, as shown in FIG. 1. When the valve is utilized in a vertical or substantially vertical configuration, as shown in FIG. 1, the angling of the bonnet facilitates material drainage from the bonnet, thereby reducing packing therein. The influence of gravity upon the material within the bonnet results in drain down of that material. When the valve is open, material flow tends to aspirate the angled valve body chamber. Of course, if the valve is being implemented in a horizontal or substantially horizontal conduit, the effects of angling become less significant.

The tilted design of the present invention further reduces the tendency of packing in the bonnet region. As seen in FIG. 1, the tilted valve design results in the formation of air pocket 1A within the bonnet. The air pocket prevents sediment from accumulating in the valve chamber in two ways. First, the air pocket prevents material from accumulating in the volume occupied by the air, thus providing adequate space for swing arm 4 to displace material during its swing into and out of the open position. The problem of jamming or packing of deposited sediment is thus significantly reduced. Second, after the valve is reopened from a closed position, pressurized air pocket 1A is released which acts to blow out material from the valve chamber, allowing the valve chamber to automatically clean itself each time it is opened.

As is apparent, the numerous features of the gate valve depicted in FIGS. 1 and 2 operate in harmony to reduce packing within the bonnet region of the valve. First, by implementing a disk having a concave upper face, eddy currents are induced which direct fluid flow away from the bonnet region. Springs 5 are circumferentially located to enable the concave formation in the disk surface. In addition to the concave disk, the bonnet is angled with respect to the conduit to allow material drainage and the formation of an air pocket and to enable the material to blow out when the valve is manipulated from the closed to the opened positions.

FIG. 3 shows a cross-sectional view of the swing arm 4 and stem 8. The stem has an expanded annular portion 9 which is used to prevent blow out. If pressure from material flow on swing arm 4 forces stem 8 downward, then the expanded annular portion will abut against journal 12 thus preventing blow out of stem 8. The stem is supported by three piloting journal bearings (10a, 10b and 10c). These bearings inhibit wobble in the stem, minimizing wear at the seal locations, infra, and the journal bearing surfaces. Located on a middle region of the stem 8 is a labyrinth seal 11 of a type well know in the art and of proper diameter to allow for its free rotation. The journals or thrust bearings in conjunction with the labyrinth seal also assure a fluid tight seal around stem 8, thereby forming a high integrity gland area.

Capping member 12A is bolted to bonnet 1 by bolts 12B or the like for easy disassembly and servicing of the various seal components and bearings. Because of expanded annular portion 9, the stem is not removable except by disassembly of the bonnet or valve chamber. Stem 8 is non-rotatably connected to swing arm 4 by welding a pair of 90° offset keys and key ways (not shown in the figures) or other similar known mechanisms, such as squaring the connection between the stem and the swing arm.

In the embodiment of FIG. 5, a stem portion similar to that of FIG. 3 is illustrated. However, in lieu of an expanded annular portion to prevent blow out, snap ring 13 is provided. Located on a middle region of stem 8 is snap ring groove 13A in which snap ring 13 closely fits. The snap ring acts against downward thrust bearing 13B. In this embodiment, seals 14 located around stem 8 insure a fluid tight seal in the packing gland region.

Figure 6:
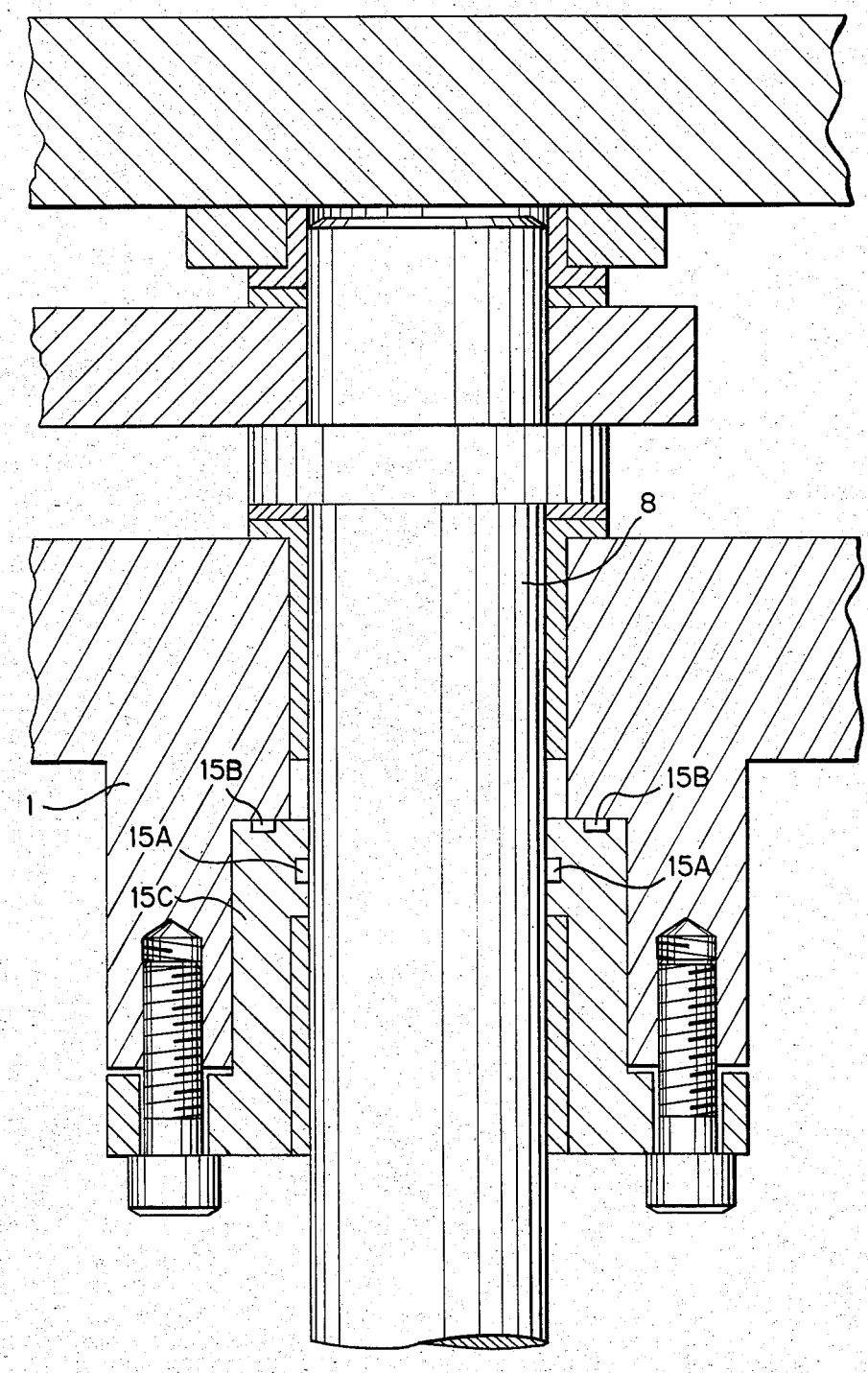
FIG. 6 is a cross-sectional view of a sealed stem and packing gland according to another embodiment of the present invention.

FIG. 6 shows a cross-sectional view of still another stem sealing embodiment. The stem portion of FIG. 6 resembles that of FIG. 3, except instead of a labyrinth seal, two standard O-rings 15A, 15B are employed. O-ring 15A is located on a middle region of the stem body 15C. The second O-ring, O-ring 15B, is located at an interface between the stem body 15C and the valve body 1. The two O-rings in conjunction provide a fluid-tight seal along all potential fluid leakage locations in the packing gland region. As in FIGS. 3 and 5, valve stem 8 of FIG. 6 is supported over better than half the length of the stem in order to minimize wobble, enabling the stem and packing gland region to withstand the torques exerted on the stem in operation.

In each of the embodiments of the present invention, the stem is supported to withstand torques exerted upon it so it will not deform when actuation forces are exerted thereon. By minimizing deformation of the stem, the disk and swing arm are stabilized, i.e., they do not tend to wobble when actuation forces are applied to the stem. Because the stem is properly supported, the packing remains tighter, thereby preventing leakage.

FIG. 7 illustrates a cross-sectional view of another preferred embodiment of the packing gland region of the instant invention, implementing a durable metallic mechanical seal. Stem 8 includes a threaded region 8A adapted to receive rotatable clamping nut 17, to which is welded rotatable flange 16. Expanded annular portion 9 defines a shoulder 9A. Sandwiched between shoulder 9A and clamping nut 17 is a crushable material 9B adapted to be crushed upon tightening of clamping nut 17.

Rotatable flange 16 defines a J-shaped lip 18 at its end remote from the clamping nut 17. The J-shaped lip of rotatable flange 16 is in interlocking engagement with a similar, but oppositely directed J-shaped lip 19 of a fixed flange 20. Fixed flange 20 is welded at its end opposite the J-shaped lip to a portion of crushable material 21. Crushable material 22 is adapted to be crushed to form a fluid-tight seal upon securing of cap 12A by bolts 12B.

Disposed between the interlocking J-shaped lips of the rotatable and fixed flanges is spring 22, coated with a nonfrictional coating, e.g., teflon.

Seal 23 is further provided to prevent fluid leakage from the packing gland region. A chamber 24 is packed with oil, or other viscous material, to further reduce leakage around the mechanical seal. A fluid filling hole (not shown) is provided for filling the packing gland area.

The above-described mechanical seal is assembled as follows. Clamping nut 17 is located on stem 8, such that it abuts, but does not crush the crushable material. The interlocking lips of the rotatable and fixed flanges, as well as the spring, are loosely engaged prior to placement of the clamping nut on the stem. The clamping nut is then rotated so as to crush the crushable material; urging the J-shaped lips into close engagement with the teflon coated spring. The cap and capping bolts are then assembled and tightened, crushing crushable material 21, thereby forming fluid-tight seal.

As will be appreciated by those skilled in the art, the mechanical seal will enable 90° rotation of the stem, yet provide durable sealing action with a seal whose life should be coextensive with that of the valve, i.e., the seal may never need replacing.

FIG. 8 shows a double disk design of the present valve. The double disk 25 allows the valve to handle material and pressure flow in either direction of the conduit. Inasmuch as the double disk valve is similar to the single disk valve of FIG. 1, only the distinctions therebetween are elaborated upon herein.

Swing arm 4 journals a pair of disks 2A,2B, having oppositely disposed concave portions for creating fluid diverting eddy currents, in the same manner as described with respect to the single disk embodiment. Unlike the single disk embodiment in which the circumferential springs are located between the disk and the swing arm, springs 5 having rivet heads 6 on both ends engage the respective first and second disks to bias them against their respective seats 3B,3C. The double disk valve is, in all other major respects, similar to the single disk valve and possesses all of the advantages described with respect thereto.

Figure 9:
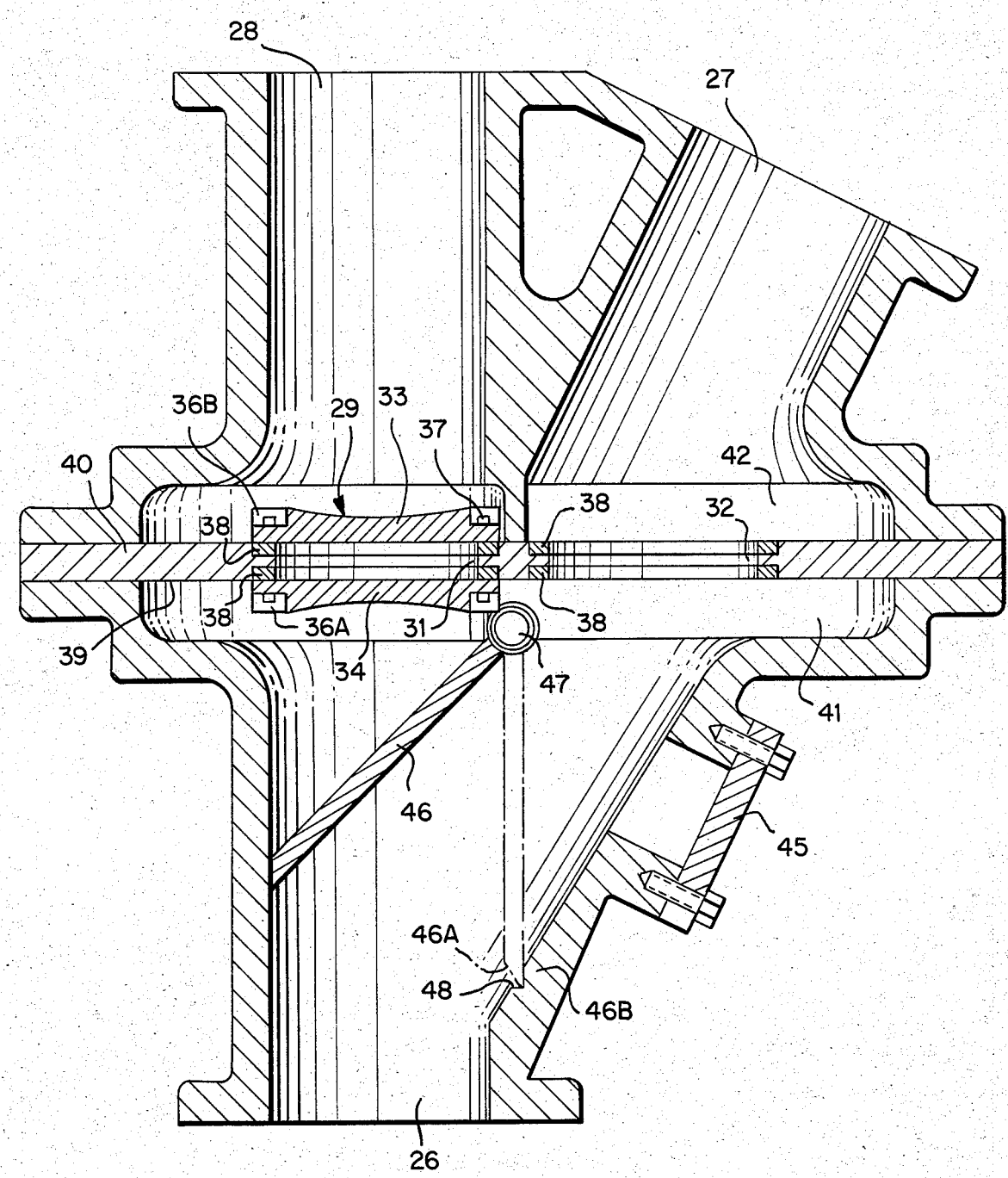
FIG. 9 is a cross-sectional view of a diverter valve chamber acording to the present invention.

FIG. 9 illustrates an alternative application for a valve having many of the above-described features. A diverter, illustrated in FIG. 9, is a Y-shaped conduit with a valving arrangement interposed to direct fluid flow to either limb of the "Y". Fluid pressure is introduced from conduit 26 into a selective one of conduits 27 or 28. A double disk valving arrangement is selected to accommodate systems in which the non-selected conduit (27 or 28) will see a back pressure from further down in the system.

A problem characteristic of Y-shaped conduits of the type set forth herein is that high pressure, high velocity fluids tend to impinge upon the valve disk, resulting in substantial cavitation in the vicinity of the disk. This cavitation induces rocking and vibration of the disk, eroding the sealing faces and reducing the life of the valve. Additionally, as the valve rocks, the likelihood of material leakage across the seals is significantly increased.

This embodiment of the instant invention employs first 29 and second 30 double disk valves for respectively closing first 31 and second 32 ports. Both double disk valves (one of which can be seen in FIGS. 8 and 9) are identical, each comprising an outlet side disk 33 and an inlet side disk 34. Similar to the previously described single disk arrangements, the inlet and outlet side disks are journalled in a swing arm 35. The swing arm in this embodiment is a unitary member comprised of inlet 36A and outlet 36B side components.

Circumferentially located in the inlet and outlet side components of each of the swing arms is a plurality of rivet headed springs (not shown in figure) piloted in spring locating holes 37. The rivet headed springs are interposed between the disks and the respective swing arm side components, and operate to bias the disks against their respective seals 38 when in the closed position, and against the flat surfaces 39, 40 of valve chamber 41,42 when in the opened position. As with the single disk embodiment, the springs stabilize the swing arm and disk arrangements, eliminating cantilevering thereof.

The disks 33,34 of each of the double disk valves contain concave recesses to establish eddy currents diverting fluid flow, thereby reducing the tendency of material to pack in the valve chamber region and allowing a better distribution of the forces urging the disk against the seat faces.

Stems 43 and 44 (FIG. 10) are provided to selectively open and close the respective conduit ports. The stems may be individually operable to enable either one to be opened or closed, thereby creating four (4) operational states: both ports open; both ports closed; left port open, right port closed; and right port open, left port closed. Alternatively, the stems may be geared together such that when one port is open the other is always closed, and vice versa.

An access port 45 is provided at the inlet side of the Y-shaped diverter valve for cleaning and servicing access. A similar port can be provided at the respective outlet conduits.

The inlet and outlet side components of each respective swing arm may be staggered, or slightly offset, such that inlet side disk completely closes just prior to the full closure of the outlet side disk. This will allow material to flush and drain out of the region interposed between the two disks, eliminating packing of material in the region. Moreover, staggering of the inlet and outlet side disks enables trapped air between the disks to escape, thus allowing both disks to tightly seal.

A diverter plate 46 is shown in FIGS. 9, 11 and 12, which functions to divert material flow from one opening to the other. This will keep the closed disk from bouncing on the closed seat. Because any fluid which impinges upon the respective closed disk is substantially slowed down by the diverter plate, the wear upon the disk and seat is substantially reduced. The diverter plate is non-rotatably fixed by key way, or the like, to a shaft 47 carried in the diverter valve wall. At its end opposite shaft 47, the diverter plate is rounded and bevelled so as to intimately contact the valve wall in either selected position. When the plate is in the left most position (as shown in FIG. 9 in solid lines), the bevel 46A engages the valve wall to create a tight seal. Similarly, when the plate is in its right most position, edge 46B of plate 46 engages seat 48, defined by the valve wall.

The diverter plate is not necessarily fluid-tight, and does not function as a valve, per se. Instead, the diverter plate merely diverts material away from the closed double disk valve and to the opened double disk valve.

As will be appreciated by those skilled in the art, the instant invention is not limited to the embodiment described herein, and the scope of this invention shall be limited only in respect of the claims appended hereto.

What is claimed is:

1. A mechanical seal for a shaft exit, comprising:
   a shaft having a threaded portion thereon;
   a fixed housing;
   a first flange having a J-shaped lip, said first flange being secured to a flange clamping nut located on said threaded portion of said shaft;
   a second flange having a J-shaped lip, said second flange adapted to be fixed to said housing, said lip of said first flange being oppositely disposed with respect to said lip of said second flange, said lips overlapping to define an annular chamber;
   a sealing ring disposed within the annular chamber defined by said lips;
   whereby said clamping nut is tightened on said shaft, thereby urging said lips of said flanges into intimate contact with said sealing ring.

* * * * *